US012655062B2

(12) United States Patent
Kuo

(10) Patent No.: US 12,655,062 B2
(45) Date of Patent: Jun. 16, 2026

(54) NANOMATERIAL CERAMIC SPHERES, PREPARATION METHOD, AND APPLICATION THEREOF

(71) Applicant: Wei-Ling Kuo, Kaohsiung (CN)

(72) Inventor: Wei-Ling Kuo, Kaohsiung (CN)

(73) Assignee: Wei-Ling Kuo, Kaohsiung (CN)

( * ) Notice: Subject to any disclaimer, the term of this patent is extended or adjusted under 35 U.S.C. 154(b) by 736 days.

(21) Appl. No.: 18/071,622

(22) Filed: Nov. 30, 2022

(65) Prior Publication Data

US 2024/0101480 A1 Mar. 28, 2024

(30) Foreign Application Priority Data

Sep. 28, 2022 (CN) .......................... 202211190425.4

(51) Int. Cl.
| | |
|---|---|
| *C04B 33/04* | (2006.01) |
| *C04B 33/13* | (2006.01) |
| *C04B 33/14* | (2006.01) |
| *C04B 33/32* | (2006.01) |

(52) U.S. Cl.
CPC .......... *C04B 33/04* (2013.01); *C04B 33/1315* (2013.01); *C04B 33/14* (2013.01); *C04B 33/32* (2013.01); *C04B 2235/3232* (2013.01); *C04B 2235/3244* (2013.01); *C04B 2235/3472* (2013.01); *C04B 2235/349* (2013.01); *C04B 2235/528* (2013.01); *C04B 2235/5427* (2013.01); *C04B 2235/6567* (2013.01); *C04B 2235/94* (2013.01)

(58) Field of Classification Search
CPC .... C04B 33/04; C04B 2235/528; F02M 27/00
See application file for complete search history.

(56) References Cited

FOREIGN PATENT DOCUMENTS

| | | | |
|---|---|---|---|
| CN | 1348936 A | | 5/2002 |
| CN | 1587185 A | | 3/2005 |
| CN | 101045628 A | | 10/2007 |
| CN | 101382101 A | | 3/2009 |
| CN | 102391690 A | * | 3/2012 |
| CN | 108623224 A | | 10/2018 |
| CN | 111363202 A | | 7/2020 |
| CN | 212132417 U | * | 12/2020 |
| JP | 2011037654 A | | 2/2011 |
| TW | 200819618 A | | 5/2008 |
| WO | 2009114960 A1 | | 9/2009 |

OTHER PUBLICATIONS

English text for CN 102391690 A (Year: 2012).*
English text for CN 21232417 U (Year: 2020).*
Li Jianfei, et al., Research on the Efficiency of Decomposition of Hydrocarbon in Exhaust gas from Vehicles by Nanometer Titanium dioxide, Highway Engineering, 2010, pp. 151-155, vol. 35 No. 2.

* cited by examiner

*Primary Examiner* — Benjamin L. Utech
(74) *Attorney, Agent, or Firm* — Bayramoglu Law Offices LLC

(57) ABSTRACT

Nanomaterial ceramic spheres, a preparation method, and an application thereof are provided. The raw materials of the nanomaterial ceramic spheres include 1-30 parts of nano-titanium dioxide, 1-30 parts of nano-zirconia, 1-30 parts of nano-tourmaline, and 1-30 parts of kaolin. In the present invention, mixing a first part of kaolin with water, rubbing it into soft spheres, and baking to obtain sphere cores; mixing a second part of kaolin, nano-titanium dioxide, nano-zirconia, and nano-tourmaline and performing a pre-mixing to obtain a pre-mixed material; mixing the sphere cores, water, an adhesive, and the pre-mixed material and rubbing into rounds to obtain a nanomaterial; baking the nanomaterial to obtain the nanomaterial ceramic spheres. The nanomaterial ceramic spheres significantly improve fuel combustion efficiency and meet the functional requirements of energy conservation.

13 Claims, 2 Drawing Sheets

Wave No.(cm-1)

NANOMATERIAL CERAMIC SPHERES, PREPARATION METHOD, AND APPLICATION THEREOF

CROSS REFERENCE TO THE RELATED APPLICATIONS

This application is based upon and claims priority to Chinese Patent Application No. 202211190425.4, filed on Sep. 28, 2022, the entire contents of which are incorporated herein by reference.

TECHNICAL FIELD

The present invention relates to the technical field of fuel enhancing device, particularly nanomaterial ceramic spheres, a preparation method, and an application thereof.

BACKGROUND

In recent years, global warming and severe climate change have been mainly caused by the extensive use of petroleum products in which factories and diesel and gasoline vehicles are the primary sources of emissions.

However, due to the engine art being limited, the state of the prior art does not provide any solution for the complete combustion of the hydrocarbons in the fuel in the combustion chamber. Incomplete combustion of the hydrocarbons in the fuel leads to the loss of fuel, generation of a large amount of toxic exhaust gas, and results in severe air pollution and accumulation of carbon in combustion devices, which decreases the service life of the machines.

At present, for a variety of fuel-saving devices sold on the market, which are used in fuel tubes, fuel tanks, or battery wires, most of the devices adopt rubber material mixed with functional powder for thermoforming. However, consumers have not been very satisfied with fuel-saving devices thermoformed with a mixture of rubber material and functional powder, and the service life of the material is not long. Thus, there is much room for improvement in the proportion of material composition, dispersion, contact area, and preparation process.

SUMMARY

The purpose of the present invention is to provide nanomaterial ceramic spheres, a preparation method, and an application thereof to solve the problem of the unsatisfactory use effect of a fuel-saving product in the prior art.

To achieve the purpose of the present invention, the present invention provides the following technical solutions:

The present invention provides nanomaterial ceramic spheres prepared from the following raw materials in parts by weight:

1-30 parts of nano-titanium dioxide, 1-30 parts of nano-zirconia, 1-30 parts of nano-tourmaline, and 1-30 parts of kaolin.

Preferably, the particle size of nano-titanium dioxide, nano-zirconia, and nano-tourmaline is 1000-10000 mesh independently.

The present invention also provides a preparation method for the nanomaterial ceramic spheres, including the following steps:

(1) Mixing a first part of kaolin with water, rubbing it into soft spheres, and baking to obtain sphere cores;

(2) Mixing a second part of kaolin, nano-titanium dioxide, nano-zirconia, and nano-tourmaline and performing pre-mixing to obtain a pre-mixed material;

(3) Mixing the sphere cores, water, an adhesive, and the pre-mixed material and rubbing them into rounds to obtain a nanomaterial; and (4) Baking the nanomaterial to obtain the nanomaterial ceramic spheres.

Steps (1) and (2) are not required to be in sequence.

Preferably, in step (1), the mass ratio of the first part of kaolin and water is 5-10: 1-3.

Preferably, in step (1), the particle size of the soft spheres is 0.8 mm-2.2 mm.

Preferably, in step (1), a baking temperature is 1100° C.-1400° C.; a baking time is 40 h-52 h.

Preferably, the mass ratio of the first part of kaolin and the second part of kaolin is (8-10):(6-8).

Preferably, in step (3), the mass ratio of the sphere cores, water, and the adhesive is (6-9):(0.1-2):(0.1-2); the particle size of the nanomaterial is 2 mm-30 mm.

Preferably, in step (4), the baking temperature is 800° C.-1300° C.; the baking time is 40 h-52 h.

The present invention further provides an application of the nanomaterial ceramic spheres in enhancement, activation, promotion of efficient fuel combustion, and reduction of exhaust emissions.

The technical principle and advantages of the present invention are as follows:

One of the main reasons that fuel can not be fully and completely burned in a cylinder is that the composition of the fuel contains hydrocarbon molecules with high molecular weight, such as benzene, etc. It takes time for these large hydrocarbon molecules to decompose and be burned adequately at high temperatures. A hydrocarbon group hidden in the innermost part of the molecules is often quickly discharged from the cylinder without the opportunity to be mixed and burned with oxygen in a short explosive period, so it becomes the main component of harmful exhaust gas.

Calculated by the theoretical model of an electron gas in quantum mechanics, the fundamental modes of such molecules are estimated to be about 0.09 eV-0.42 eV. Further, derived from Planck's formula, the following simplified formula of photon kinetic energy is obtained:

$$\lambda(\mu m)=1.2398(eV\text{-}\mu m)/E(eV),$$

where $\lambda$ is the wavelength of the photon with the unit of micron ($\mu m$) and E is the kinetic energy of the photon with the unit of electron volt (eV).

It can be calculated by using the formula: Far-infrared photons with wavelengths between 3 $\mu m$-14 $\mu m$ can provide enough energy to overcome potential energies of 0.09 eV-0.42 eV, so the electrons trapped in the force field are excited by resonance to increase the fundamental modes. In fact, in the study of organic chemistry, it has been pointed out that: Infrared rays with wavelengths of 3 $\mu m$-14 $\mu m$ can trigger molecular stretching and bending vibrations. On the other hand, according to the infrared absorption spectrum of organic chemistry, saturated covalent bonds (C—H) in hydrocarbon molecules can absorb photons at 3.2 $\mu m$-3.6 $\mu m$ wavelength in resonance, while the non-saturated divalent carbon bond (C=C) and trivalent carbon bond (C≡C) can absorb photons in the bands of 5.8 $\mu m$-6.2 $\mu m$ and 4 $\mu m$-4.7 $\mu m$, respectively.

Based on the above reasons, the family of hydrocarbon molecules has an infrared-active property to absorb far-infrared photons at a range of 3 $\mu m$-14 $\mu m$ to produce stretching and bending resonance vibrations of molecular bonds, thereby reducing a chemical reaction activation barrier and increasing a chemical reaction rate. It can be seen that far-infrared rays can excite bond energies between molecules of fuel by resonance. Only a small amount of energy can break the Van der Waals force between the molecules of fuel, so clusters of the molecules of fuel become smaller and have higher kinetic energy, which is easy to fully fuse and burn with oxygen and recombine to form carbon dioxide and water vapor along with releasing energy. In short, the heat energy conversion efficiency of fuel (liquid and gas) in the cylinder of the engine can be improved. Thus, the same output power can be achieved with less fuel consumption. At the same time, the concentration of emitted hydrocarbon and carbon monoxide caused by incomplete combustion or the concentration of emitted micro-carbon particles in diesel engines will also be significantly reduced. In addition, because the heat energy contained in the fuel is transferred into effective work and the heat consumption of the exhaust gas is relatively reduced, the temperature of the exhaust gas will not be increased, thereby suppressing the generation of NOx. Generally, not only the energy conservation can be achieved, but exhaust emissions can also be generally reduced.

The inventor of the present application uses several nano-scale natural ores to invent nano ceramic granulation technology. The technology uses kaolin as a combined component of several nanomaterials and adopts the process of rubbing and sticking to produce a porous surface and stacking layers, which were crystallized into spheres after sintering at the condition of high temperature of 1300° C. The spheres provide the best wavelength irradiance for fuel enhancing device and increase the contact surface area to maximize the characteristics of nanomaterial, which has the advantages of weather resistance, non-combustibility, acid-alkali resistance, antistatic, etc.

The electrons of the far-infrared radiation ceramic materials prepared by the present disclosure can be excited to a higher energy level by absorbing the ambient heat energy above absolute zero (or minus 273 degrees Celsius). The wavelength of photons released can fall into the far-infrared spectral range with microns wavelength, which is the most suitable for fuel enhancing device, thereby significantly improving the efficiency of fuel combustion and meeting the functional requirements of energy conservation.

In addition, the nano far-infrared ceramic spheres are only a medium for energy transfer without any chemical reaction involved. Further, due to the eternal existence of environmental thermal energy, the nano far-infrared radiation of the fuel enhancing ceramic spheres will not be exhausted and can be permanently effective.

DETAILED DESCRIPTION OF THE EMBODIMENTS

Figure 1:
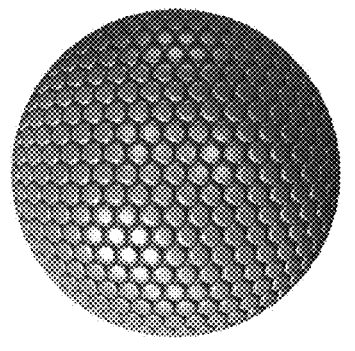
FIG. 1 shows a schematic diagram of a structure of a nanomaterial ceramic sphere in the present application.

The present invention provides nanomaterial ceramic spheres prepared from the following raw materials in parts by weight:

1-30 parts of nano-titanium dioxide, 1-30 parts of nano-zirconia, 1-30 parts of nano-tourmaline, and 1-30 parts of kaolin.

In the present invention, the nano-titanium dioxide is 1-30 parts, preferably 5-25 parts, further preferably 10-20 parts, and even further preferably 14-16 parts.

In the present invention, the nano-zirconia is 1-30 parts, preferably 5-25 parts, further preferably 10-20 parts, and even further preferably 14-16 parts.

In the present invention, the nano-tourmaline is 1-30 parts, preferably 5-25 parts, further preferably 10-20 parts, and even further preferably 14-16 parts.

In the present invention, the kaolin is 1-30 parts, preferably 5-25 parts, further preferably 10-20 parts, and even further preferably 14-16 parts.

In the present invention, the particle size of nano-titanium dioxide, nano-zirconia, and nano-tourmaline is 1000-10000 mesh independently, preferably 2000-8000 mesh, and further preferably 4000-6000 mesh.

In the present invention, the purity of nano-titanium dioxide, nano-zirconia, and nano-tourmaline are greater than 99.5%, preferably greater than 99.9%.

The present invention also provides a preparation method for the nanomaterial ceramic spheres, including the following steps:

(1) After a first part of kaolin is mixed with water and rubbed into soft spheres, baking is conducted to obtain sphere cores.

(2) After a second part of kaolin, nano-titanium dioxide, nano-zirconia, and nano-tourmaline are mixed, pre-mixing is carried out to obtain a pre-mixed material.

(3) After the sphere cores, water, an adhesive, and the pre-mixed material are mixed and rubbed into rounds, a nanomaterial is obtained.

(4) The nanomaterial is baked to obtain the nanomaterial ceramic spheres.

Steps (1) and (2) are not required to be in sequence.

In the present invention, in step (1), the mass ratio of the first part of kaolin and water is 5-10: 1-3, preferably 6-8:2.

In the present invention, in step (1), the particle size of the soft spheres is 0.8 mm-2.2 mm, preferably 1 mm-2 mm, and further preferably 1.5 mm-1.8 mm.

In the present invention, in step (1), a baking temperature is 1100° C.-1400° C., preferably 1150° C.-1350° C., and further preferably 1200° C.-1300° C.; a baking time is 40 h-52 h, preferably 42 h-50 h, and further preferably 45 h-48 h.

In the present invention, the soft spheres rubbing in step (1) is carried out in a rounder; the pre-mixing in step (2) is carried out in a pre-mixer machine; the rounds rubbing in step (3) is carried out in the rounder; the baking in step (4) is carried out in a circulating-type tunnel oven equipment.

In the present invention, the mass ratio of the first part of kaolin and the second part of kaolin is (8-10):(6-8), preferably 9:7.

In the present invention, in step (3), the mass ratio of the sphere cores, water, and adhesive is (6-9):(0.1-2):(0.1-2), preferably (7-8):(0.5-1.5):(0.5-1.5). The particle size of the nanomaterial is 2 mm-30 mm, preferably 5 mm-25 mm, further preferably 10 mm-20 mm, and even further preferably 12 mm-18 mm.

In the present invention, in step (4), the baking temperature is 800° C.-1300° C., preferably 900° C.-1200° C., and further preferably 1000° C.-1100° C.; the baking time is 40 h-52 h, preferably 42 h-50 h, and further preferably 45 h-48 h.

The present invention further provides the application of the nanomaterial ceramic spheres in enhancement, activation, promotion of efficient fuel combustion, and reduction of exhaust emissions.

The technical solutions provided by the present invention are described in detail below in conjunction with embodiments, but they shall not be construed as a limit to the scope of protection of the present invention.

The kaolin in each embodiment of the present invention is specifically Longyan kaolin, and the chemical composition is as follows: 30 wt %-35 wt % of $Al_2O_3$, 48 wt %-52 wt % of $SiO2$, 0.5 wt %-1 wt % of Fe2O3, 0.1 wt %-0.3 wt % of CaO, 0.05 wt %-0.15 wt % of MgO, about 7 wt % of K2O3, 0.3 wt %-0.6 wt % of Na2O, 0.03 wt %-0.11 wt % of TiO2, and 7 wt %-13 wt % of the firing loss.

In each embodiment of the present invention, the adhesive is a polymeric interface active agent RA-2 that is purchased from Kester International Co., LTD.

Embodiment 1

9 parts of kaolin and 1 part of water are mixed, rubbed into soft spheres with a diameter of 2 mm by a rounder, and baked at 1100° C. for 48 h to obtain sphere cores.

After 7 parts of kaolin, 1 part of nano-titanium dioxide, 1 part of nano-zirconia, and 1 part of nano-tourmaline are mixed, pre-mixing is carried out to obtain a pre-mixed material.

The sphere cores, 0.9 parts of water, 0.1 parts of RA-2 adhesive, and the pre-mixed material are mixed and rounded in the rounder to obtain a nanomaterial with a diameter of 3 mm-5 mm.

The nanomaterial is baked at 1100° C. for 48 h to obtain the nanomaterial ceramic spheres.

Embodiment 2

9 parts of kaolin and 1 part of water are mixed, rubbed into soft spheres with a diameter of 2 mm by a rounder, and baked at 1200° C. for 46 h to obtain sphere cores.

After 7 parts of kaolin, 2 parts of nano-titanium dioxide, 2 parts of nano-zirconia, and 3 parts of nano-tourmaline are mixed, pre-mixing is carried out to obtain a pre-mixed material.

The sphere cores, 0.9 parts of water, 0.1 parts of RA-2 adhesive, and the pre-mixed material are mixed and rounded in the rounder to obtain a nanomaterial with a diameter of 3 mm-5 mm.

The nanomaterial is baked at 1000° C. for 48 h to obtain the nanomaterial ceramic spheres.

Embodiment 3

9 parts of kaolin and 1 part of water are mixed, rubbed into soft spheres with a diameter of 2 mm by a rounder, and baked at 1300° C. for 48 h to obtain sphere cores.

After 7 parts of kaolin, 3 parts of nano-titanium dioxide, 1 part of nano-zirconia, and 2 parts of nano-tourmaline are mixed, pre-mixing is carried out to obtain a pre-mixed material.

The sphere cores, 0.9 parts of water, 0.1 parts of RA-2 adhesive, and the pre-mixed material are mixed and rounded in the rounder to obtain a nanomaterial with a diameter of 3 mm-5 mm.

The nanomaterial is baked at 1250° C. for 45 h to obtain the nanomaterial ceramic spheres.

After the nanomaterial ceramic spheres obtained in Embodiment 1 are assembled, tests are performed, and the details are as follows:

(1) Tested by TÜV Rheinland Taiwan, the vehicle to be tested is a 2005 Ford Escape 2.3 L 2WD gasoline car, and the road run procedure of the US FPT-75 test is adopted. Under the same road section and driving conditions, the fuel consumption condition of the vehicle is tested at a medium speed (60 km/h), a high speed (90 km/h) for a car without the product installed (control group) and a car with the product installed (experimental group). The driving information is recorded by GPS. It is verified that the fuel saving rate reaches 11.71% when the car drove 37.5 km at 60 km/h and that the fuel saving rate reaches 14.11% when the car drove 18.7 km at 90 km/h.

(2) Tested by SGS Taiwan Testing Technology Co., LTD., the vehicle to be tested is a BENZ 2400 cc German gasoline car, and the road run procedure of the US FPT-75 test is adopted. Under the same road section and driving conditions, the mileage per liter for the vehicle without the product installed is 12.79 km/L, while the mileage per liter for the vehicle with the product installed is increased to 14.32 km/L. The fuel-saving rate is 10.68%. The specific test results are shown in Table 1:

TABLE 1

| | Results of the SGS test | | | | |
|---|---|---|---|---|---|
| BENZ 2400 cc | Mileage per liter without installing the fuel-saving product (km/L) | Average speed without installing the fuel-saving product (km/hr) | Mileage per liter with the fuel-saving product (km/L) | Average speed with the fuel-saving product (km/hr) | Fuel-saving rate (%) |
| General road | 12.79 | 46.6 | 14.32 | 46.7 | 10.68 |

Note1.
The air conditioning system of the vehicle to be tested is turned on during the test.

(3) The test is conducted using the standards of California Environmental Engineering (CEE), the most stringent professional test site recognized by EPA and CARB, California, USA, and the FTP federal test procedure is used to confirm that:

The fuel efficiency is significantly improved, and the exhaust emissions such as THC, CO, and NOx are reduced for a 2004 Chevrolet Tahoe Gasoline car with the fuel-saving product installed.

The fuel efficiency is significantly improved, and all the exhaust emissions are reduced for a 2003 Doge RAM 2500 gasoline car with the fuel-saving product installed.

The fuel-saving rate is 6% for a 2005 Toyota Camry Partial Zero Emission Vehicle with the fuel-saving product installed.

The fuel-saving rate reaches 10%, and all the exhaust emissions such as HC, CO, and NOx are reduced after the 2005 Kenworth W9 large truck is equipped with a CAT 472 diesel engine with the fuel-saving product installed.

The fuel-saving rate reaches 10%, and all the exhaust emissions such as HC, CO, and NOx are reduced for a 2000 Kenworth Class 8 large truck equipped with CAT 472 diesel engine with the fuel-saving product installed.

(4) Tested by Hong Kong Polytechnic University, the vehicle to be tested is a 2003 Lexus/Toyota gasoline car (the engine number: MCV30-6-23223). An indoor dynamometer is adopted for the test method. Under the condition of constant humidity and temperature, a simulation of the vehicle is performed for 106 km at a fixed speed on the dynamometer. The vehicle without the product installed consumed 4.51 L of gasoline for 106 km, while the vehicle with the product installed consumed 4.02 L of gasoline for 106 km. The fuel saving rate is confirmed to be 10.9%.

Figure 2:
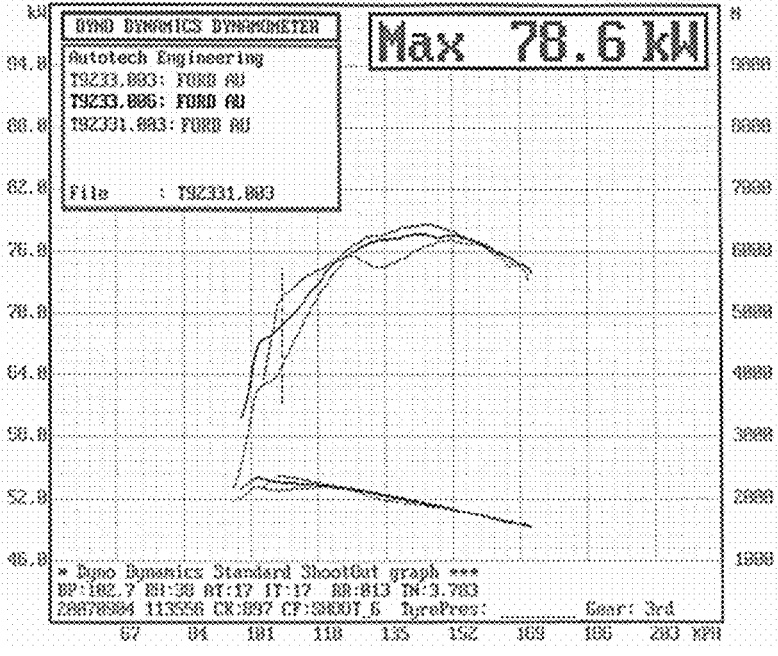
FIG. 2 shows report 1 of the DYNAMOMETER test.
Figure 3:
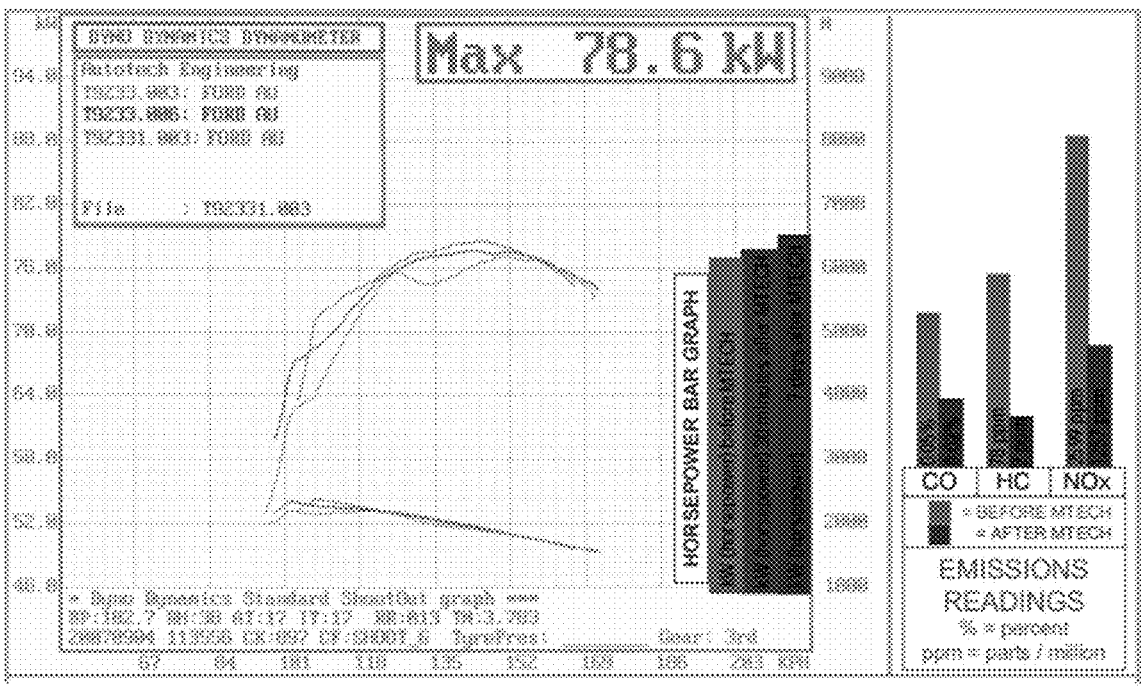
FIG. 3 shows report 2 of the DYNAMOMETER test.

(5) Tested by DYNAMOMETER in an Australian laboratory, a 2000 AU Falcon 6 Cylinder LPG car is tested. Before installation, the exhaust emission is 0% of CO, 78 ppm of HC, and 2599 ppm of NOx. After installation, the exhaust emission decreased to 0% of CO, 2 ppm of HC, and 995 ppm of NOx. For the test conducted again after one week, the exhaust emission decreased to 0.02% of CO and 10 ppm of HC, which confirms that HC emission is reduced by 97%, and NOx emission is reduced by 62%. The specific test results are shown in FIGS. 2 and 3.

(6) Automobile exhaust instruments tested by the Environmental Protection Bureau of Taipei Municipal Government, Taiwan Province:

A 1996 TOYOTA AT2EPN gasoline car is tested. Before installation, the exhaust emission is 0.20% of CO and 101 ppm of HC. After installation, the exhaust emission is reduced to 0.07% of CO and 30 ppm of HC. For the test conducted again after one week, the exhaust emission decreased to 0.02% of CO and 10 ppm of HC. The exhaust emissions are reduced by about 89.50%.

A 2004 HONDA CR-V-GX gasoline car is tested. Before installation, the exhaust emission is 0.01% of CO and 37 ppm of HC. After installation, the exhaust emission decreased to 0.01% of CO and 5 ppm of HC, which is reduced by 86.48%.

Figure 4:
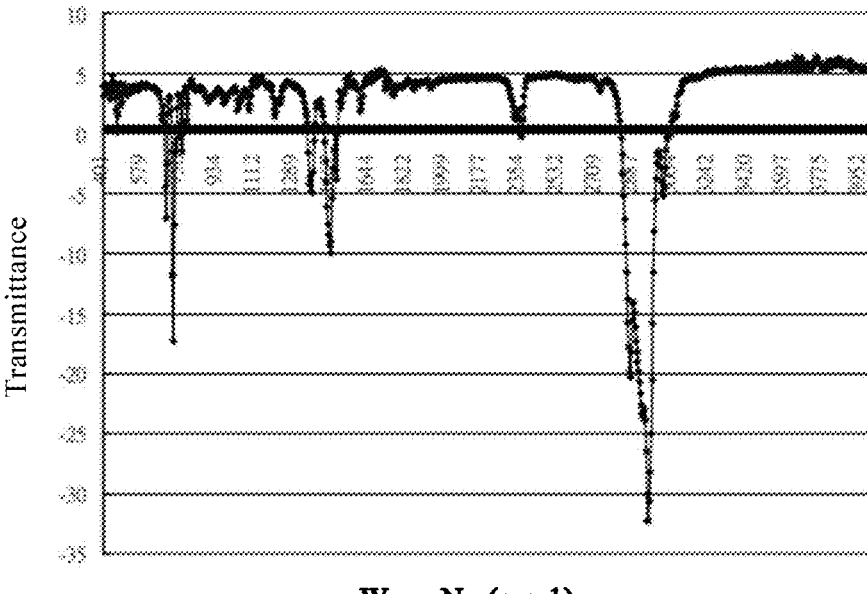
FIG. 4 shows a far-infrared radiation diagram.

(7) Tested by Infrared Spectrum research of Taipei Medical College, it is confirmed that the fuel enhancing nano ceramic spheres can absorb environmental heat energy and release specific energy wavelengths (i.e., from few microns to 20 microns (from 2900 $cm^{-1}$ to 3300 $cm^{-1}$ in wave number). This wavelength falls in the range of the infrared spectrum with the wavelength of 3 μm-14 μm, which is most suitable for fuel enhancing device. Through the Van der Waals force between fuel molecules, the fuel molecules become smaller and have higher kinetic energy, so it is easier to fully fuse with oxygen and burn, thereby significantly improving the combustion efficiency of fuel and achieving the functional requirements of energy conservation. The specific test results are shown in FIG. 4.

The above is only the preferred embodiments of the present invention. It should be pointed out that for those of ordinary skill in the art, some improvements and embellishments can be made without departing from the principle of the present invention, and these improvements and embellishments shall also be regarded as falling within the scope of the protection of the present invention.

What is claimed is:

1. A method for preparing nanomaterial ceramic spheres, wherein the nanomaterial ceramic spheres are prepared from raw materials in parts by weight, comprising:

1-30 parts of nano-titanium dioxide, 1-30 parts of nano-zirconia, 1-30 parts of nano-tourmaline, and 1-30 parts of kaolin;

wherein the method comprises steps as follows:

(1) mixing a first part of the kaolin with water to obtain a resulting kaolin, rubbing the resulting kaolin into soft spheres, and baking the soft spheres to obtain sphere cores;

(2) mixing a second part of the kaolin, the nano-titanium dioxide, the nano-zirconia, and the nano-tourmaline to obtain a first resulting mixture and performing a pre-mixing on the first resulting mixture to obtain a pre-mixed material;

(3) mixing the sphere cores, water, an adhesive, and the pre-mixed material to obtain a second resulting mixture and rubbing the second resulting mixture into rounds to obtain a nanomaterial; and (4) baking the nanomaterial to obtain the nanomaterial ceramic spheres;

wherein the steps (1) and (2) are not required to be in sequence.

2. The method according to claim 1, wherein a particle size of each of the nano-titanium dioxide, the nano-zirconia, and the nano-tourmaline is 1000-10000 mesh independently.

3. The method according to claim 1, wherein in the step (1), a mass ratio of the first part of kaolin and water is 5-10:1-3.

4. The method according to claim 1, wherein in the step (1), a particle size of each of the soft spheres is 0.8 mm-2.2 mm.

5. The method according to claim 1, wherein in the step (1), a baking temperature is 1100° C.-1400° C.; a baking time is 40 h-52 h.

6. The method according to claim 5, wherein a mass ratio of the first part of the kaolin and the second part of the kaolin is (8-10):(6-8).

7. The method according to claim 1, wherein in the step (3), a mass ratio of the sphere cores, the water, and the adhesive is (6-9):(0.1-2):(0.1-2); and a particle size of the nanomaterial is 2 mm-30 mm.

8. The method according to claim 7, wherein in the step (4), a baking temperature is 800° C.-1300° C.; and a baking time is 40 h-52 h.

9. The method according to claim 3, wherein in the step (1), a baking temperature is 1100° C.-1400° C.; a baking time is 40 h-52 h.

10. The method according to claim 4, wherein in the step (1), a baking temperature is 1100° C.-1400° C.; a baking time is 40 h-52 h.

11. The method according to claim 3, wherein in the step (3), a mass ratio of the sphere cores, the water, and the adhesive is (6-9):(0.1-2):(0.1-2); and a particle size of the nanomaterial is 2 mm-30 mm.

12. The method according to claim 4, wherein in the step (3), a mass ratio of the sphere cores, the water, and the adhesive is (6-9):(0.1-2):(0.1-2); and a particle size of the nanomaterial is 2 mm-30 mm.

13. The method according to claim 6, wherein in the step (3), a mass ratio of the sphere cores, the water, and the adhesive is (6-9):(0.1-2):(0.1-2); and a particle size of the nanomaterial is 2 mm-30 mm.

* * * * *